(12) United States Patent
Aumüller et al.

(10) Patent No.: US 6,209,969 B1
(45) Date of Patent: Apr. 3, 2001

(54) HYDRAULIC VEHICLE BRAKE SYSTEM WITH WHEEL SLIP CONTROL

(75) Inventors: Ralf Aumüller, Frankfurt am Main; Edwin Czarnetzki, Elz; Norbert Hofer, Oberursel; Stefan Schmitt, Johannesberg; Frank Thürmer, Mainz; Peter Volz; Volker Von Zeddelann, both of Darmstadt, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/077,051
(22) PCT Filed: Nov. 18, 1996
(86) PCT No.: PCT/EP96/05085
§ 371 Date: Sep. 28, 1998
§ 102(e) Date: Sep. 28, 1998
(87) PCT Pub. No.: WO97/18977
PCT Pub. Date: May 29, 1997

(30) Foreign Application Priority Data

Nov. 18, 1995 (DE) ............................... 195 43 124
Jul. 19, 1996 (DE) ............................... 196 29 135

(51) Int. Cl.[7] ............................... B60T 8/34; B60T 17/22; B60T 8/48; B60K 28/16; F16K 15/02

(52) U.S. Cl. ................................... 303/116.1; 303/113.1; 303/84.1; 303/119.3; 303/901; 303/900; 188/352

(58) Field of Search ............................. 303/116.1, 113.1, 303/900, 901, 84.1, 84.2, 119.1, 113.2, 116.2, 119.2, 119.3, 116.4; 188/352

(56) References Cited

U.S. PATENT DOCUMENTS

| 5,417,484 | * | 5/1995 | Reinartz et al. | 303/900 |
| 5,425,575 | * | 6/1995 | Schmidt et al. | 303/900 |
| 5,505,529 | * | 4/1996 | Siegel et al. | 303/116.2 |
| 5,567,128 | * | 10/1996 | Volz et al. | 303/116.4 |

OTHER PUBLICATIONS

English translation of the International Preliminary Examination Report of Application No. PCT/EP96/05085 filed Nov. 18, 1996.

* cited by examiner

*Primary Examiner*—Douglas C. Butler
(74) *Attorney, Agent, or Firm*—Rader, Fishman & Grauer PLLC (57) ABSTRACT

A hydraulic automotive vehicle brake system with wheel slip control includes at least one non-return valve with a closure member that is lifted from its valve seat during evacuation of the brake system. An elastomeric sealing element is arranged between the closure member and the valve seat member.

1 Claim, 7 Drawing Sheets

HYDRAULIC VEHICLE BRAKE SYSTEM WITH WHEEL SLIP CONTROL

BACKGROUND OF THE INVENTION

The present invention relates to a hydraulic automotive vehicle brake system with wheel slip control which includes at least one non-return valve with a valve seat and a closure member that is lifted from the valve seat during evacuation of the brake system.

German patent application No. 43 37 133 discloses a hydraulic automotive vehicle brake system with wheel slip control, wherein in each brake circuit of the anti-lock device and/or traction slip control device at least one non-return valve is used having a valve seat which is not closed by the closure member of the non-return valve upon evacuation of the brake system. The objective of this provision is that the valve seat is not covered before and during filling of the system when the system is unpressurized. Thus, a connection exists between the primary circuit and the secondary circuit by way of the open non-return valve, with the result that the secondary circuit can be evacuated and filled with fluid without the need to actuate the normally closed magnetic valve. In the capacity of a closure member, the non-return valve has a ball without a spring. During pressure increase in the system caused by a braking operation, correspondingly great flow forces must act upon the non-return valve in order that the closure member, configured as a ball, is entrained and urged against the valve seat. In another type of construction of the spherical non-return valve, the ball is pressed against its valve seat by the effect of gravitational force. However, these reflections are mainly theoretical so that it is not precluded in practical operations that the closing movement of the spherical non-return valve, which is to be effected by flow forces or by gravitational force, will reliably be provided. Due to the high sealing requirements placed on the non-return valve (which are comparable with the sealing requirements of a pressure modulation valve inserted in the outlet to the wheel brake and closed in the initial position), an absolutely reliable closure of the non-return valve must be ensured in any case. A leakage-free closing function of metallic spherical closure members is, however, not ensured in the prior art.

Therefore, an object of the present invention is to improve upon a hydraulic automotive vehicle brake system with wheel slip control of the above-mentioned type to such effect that a lowcost, functionally reliable and especially non-leaking non-return valve is provided by simple means which, in case of need, automatically permits self-exhaustion of the low-pressure accumulator and evacuation of the pump suction conduit during the high-vacuum process.

SUMMARY OF THE INVENTION

According to the present invention, these objects are achieved in a hydraulic automotive vehicle brake system of the abovementioned type by an elastomeric sealing element arranged between the closure member and the valve seat member or by a closure member in the form of a sleeve seal, wherein the valve seat member is provided by an annular area of a blind-end bore in an accommodating member that is in contact with the sleeve seal.

Further features and advantages of the present invention can be seen in the following by way of the description of several embodiments.

DETAILED DESCRIPTION OF THE DRAWINGS

Figure 1:
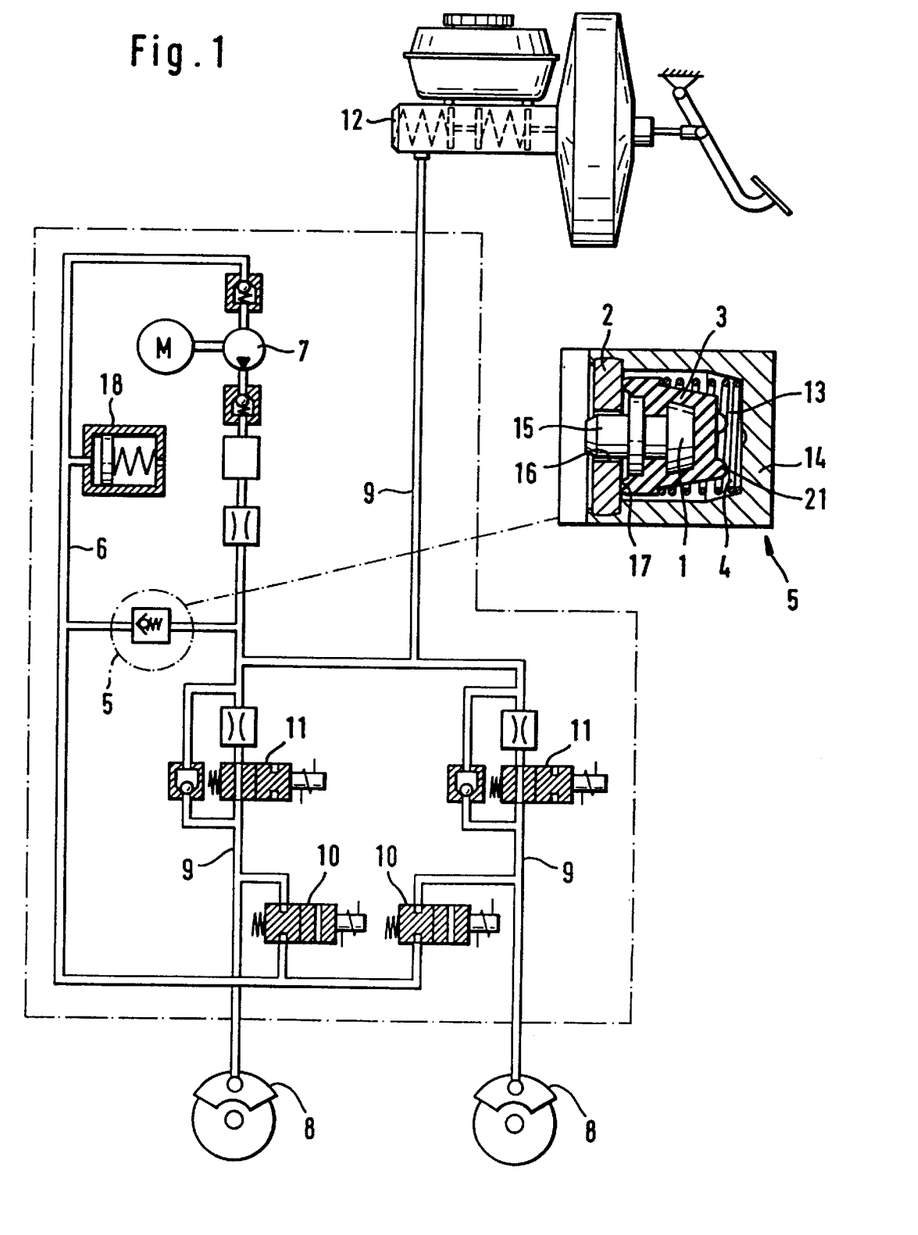
FIG. 1 is a hydraulic circuit diagram for an automotive vehicle brake system with wheel slip control, showing the construction of the non-return valve.

The embodiment of FIG. 1 shows the hydraulic circuit diagram for a hydraulic automotive vehicle brake system with wheel slip control operating according to the recirculation principle. A braking pressure conduit 9 connected to a braking pressure generator 12 is branched and leads to two wheel brakes 8. Open pressure modulation valves 11 which are not energized electromagnetically in the basic position are inserted into the branch lines of the braking pressure conduit 9. This hydraulic section of the brake system will be referred to as 'primary circuit' in the following text. Pressure modulation valves 10, closed in their basic position, are arranged between the pressure modulation valves 11, which are open in their basic position, and the wheel brakes 8. Valves 10 are connected to a suction conduit 6 of a pump 7. Connected to the suction conduit 6 is a bypass line that is connected to the braking pressure conduit 9 and accommodates a non-return valve 5. A closure member 1 of the non-return valve 5 is acted upon by a spring 4 in the closing direction, with the result that the non-return valve 5 permits a hydraulic connection exclusively from the suction conduit 6 to the braking pressure conduit 9. A low-pressure accumulator 18 is positioned in a bypass line between the point where the non-return valve 5 is inserted in the suction conduit 6 and the pump 7. The hydraulic section which extends from the pressure modulation valves 10, closed in their basic position, to the pump 7 will be termed as 'secondary circuit' hereinbelow. Pump 7 includes (schematically represented) a suction valve and a pressure valve and is in connection to the braking pressure conduit 9 by way of a subsequent noise-damping device. Constructive details of the non-return valve 5 represented in the hydraulic circuit can be seen in a view of the construction shown in the hydraulic circuit diagram. In this arrangement, the non-return valve 5 is arranged in a blind-end bore 13 of an accommodating member 14. Accommodating member 14 may be configured in a cartridge-type construction as an insert member which is separately attached in a valve block. Alternatively, valve 5 can be directly mounted downstream in the accommodating member 14 of each pressure modulation valve 10 which is closed in its basic position. The non-return valve 5 includes an elastomeric sealing element 3 between a preferably metallic closure member 1 and a metallic valve seat member 2. Sealing element 3 embraces the closure member 1 like a cap. Also, a spring 4 which is subjected to pressure load is arranged on the closure member 1 and normally retains the non-return valve 5 in its closed basic position on the valve seat member 2. The closure member 1 includes a pin 15 which is guided with play in a pressure fluid passage bore 16 of a valve seat member 2 that closes the blind-end bore 13. By the action of spring 4, the bowl-shaped elastomeric sealing element 3 bears with its sealing lip 17 against a disc-shaped sealing surface of the valve seat member 2 which is attached in the blind-end bore 13 of the accommodating member 14 by way of clinching. This is why the secondary circuit in the embodiment shown is considered as an isolated section in the hydraulic system, separated by electrically and hydraulically operable valves. Thus, according to the present invention, each brake circuit includes a non-return valve 5 which opens in the direction of the primary circuit in opposition to spring 4, connected to the secondary circuit downstream of the pressure modulation valves 10 which are normally closed in their basic position. During evacuation of the secondary circuit, the closure member 1 lifts from the valve seat member 2 due to the effect of a vacuum source in the primary circuit as soon as the pressure difference between the primary and secondary circuits has overcome the relatively weak spring 4 with an opening pressure of roughly 50 mbar. In the open position of the closure member 1, the vacuum prevailing in the blind-end bore 13 through a channel can automatically propagate between the sealing lip 17 and the pressure fluid passage bore 16 into the secondary circuit and permit evacuation of the secondary circuit of roughly 95%. When the evacuation process is completed, the closure member 1, by the action of spring 4, reliably moves into abutment on the valve seat member 2 so that, both at the commencement and the end of the hydraulic filling operation, the primary circuit is completely filled with brake fluid and an unchanged vacuum is effective in the secondary circuit. This condition of the secondary circuit is maintained until brake fluid of the primary circuit flows into the secondary circuit and fills it in a wheel slip control operation due to electromagnetic operation of the pressure modulation valve 10 which is closed in its basic position. The normal functions of the brake system, such as the normal braking operation without wheel slip and the wheel slip control case, are not influenced by the bypass isolated by the non-return valve 5 between the secondary and primary circuits because the hydraulic pressure is higher in the primary circuit than in the secondary circuit in all cases and the non-return valve 5 is subjected to the action of spring 4. Apart from this single objective of the non-return valve 5, i.e., to automatically permit the evacuation of the secondary circuit during the high-vacuum process on the assembly line at vehicle manufacturers' premises, it is another function of the non-return valve 5 to exhaust the low-pressure accumulator 18 in the direction of the primary circuit. This eliminates the need for the otherwise usual pump replenishment cycle to ensure complete exhaustion of the low-pressure accumulator 18 before wheel slip control commences. The construction of the non-return valve 5 disclosed in the present invention has major advantages over the state of the art. The advantages include the robustness of the elastomeric sealing element 3 with respect to contaminants in the hydraulic circuit, thereby rendering special filtering provisions unnecessary. Another advantage is seen in the absolutely reliable sealing of the closure member 1 on the valve seat member 2 which is due to the use of an elastomeric sealing element (material), on the one hand, and the special design of the sealing element 3 with a sealing lip 17, on the other hand. Sealing lip 17 is pressed annularly onto the valve seat member 2 by the action of spring 4. Additionally, the valve seat member 2 adopts the function of closing the blind-end bore 13 which can be achieved especially simply by clinching the valve seat member 2 in the accommodating member 14. Not only is an undesirable filling of the pressure accumulator 18 with fluid of the primary circuit during normal braking operations prevented by the spring, the latter also renders possible a partial evacuation of the secondary circuit.

Figure 2:
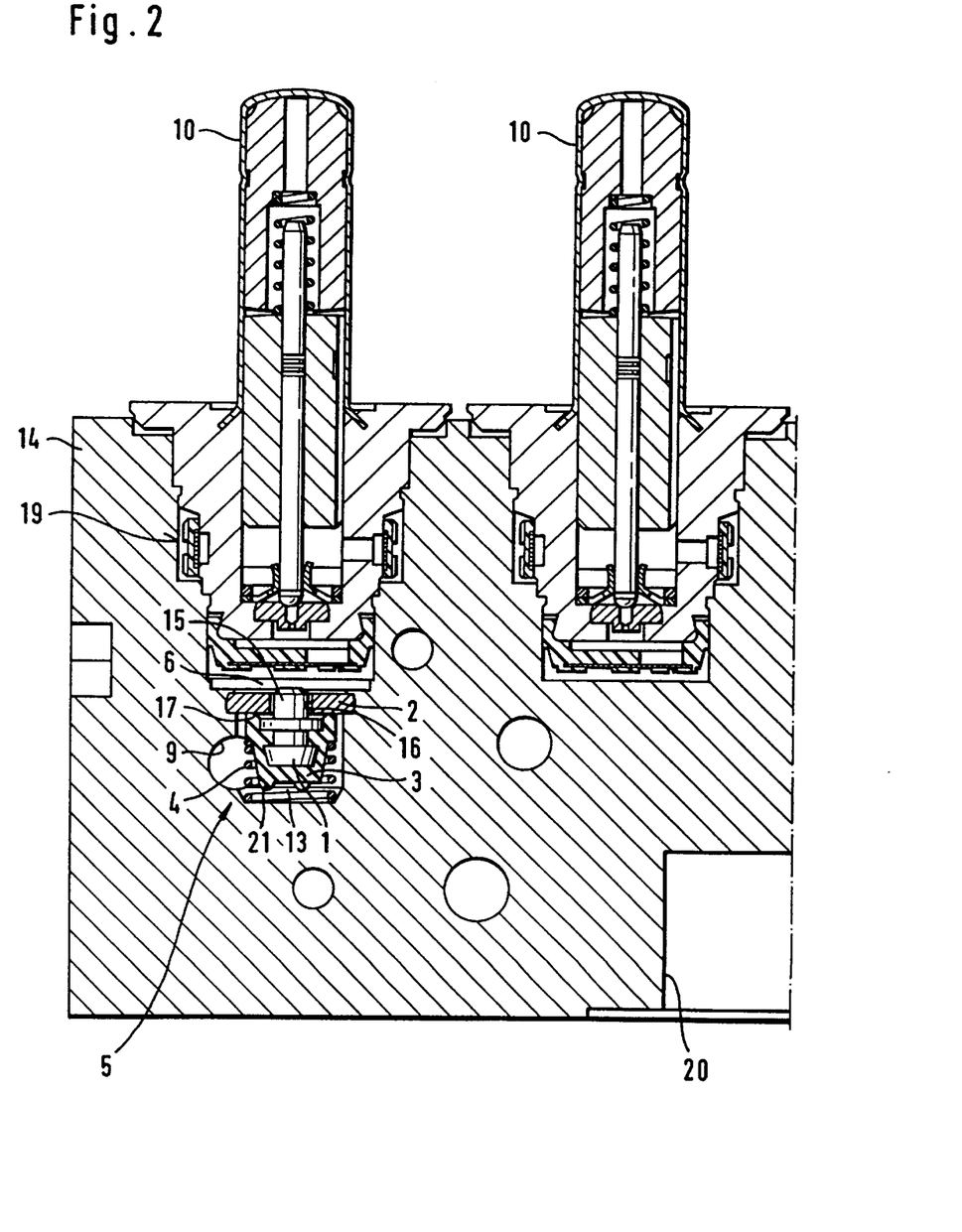
FIG. 2 is embodiment of the non-return valve in a coaxial arrangement with a pressure modulation valve closed in its basic position.

The embodiment of FIG. 2 shows a favorable arrangement of the non-return valve 5 inside an accommodating member 14 for the pressure modulation valves 10, 11. A particularly appropriate installation position for the non-return valve 5 is the stepped bore 19 in the accommodating member 14 of the pressure modulation valve 10 which is closed in its basic position. This is because the coaxial alignment of the blind-end bore 13 at the end of the stepped bore 19 provides a simple manufacture in one machining operation along with an expedient positioning for the non-return valve 5 so that the accommodating member 14 is configured in conformity with the demands of automation. The accommodating member 14 shown in the FIG. 2 embodiment accommodates the pressure modulation valves 10, 11 in two parallel valve rows. On the side of the housing body remote from the stepped bore 19, there is another stepped bore 20 in a section which is provided to accommodate an electric motor driving the pump. The pump 7 (not shown in FIG. 2) is automatically positioned transversely to the stepped bores 19, 20 in the accommodating member 14. The accommodating member 14 is also shown in a section along its line of symmetry so that the assembly of function groups is identical on the right-hand side of the line of symmetry of the accommodating member 14.

Inasmuch as not all the details of the non-return valve 5 are referred to in FIG. 2, the features shown in the drawings nevertheless correspond to the details of construction of the non-return valve 5 which have been described with respect to the FIG. 1 embodiment.

In addition to the constructive embodiments of the non-return valve 5 shown in FIGS. 1 and 2, reference is made to the knub 21 on the sealing element 3 which ensures that, in the open position of the non-return valve 5, a sufficiently large distance is maintained between the end surface of the blind-end bore 13 and the end surface on the sealing element 3 in order that the hydraulic pressure of the primary circuit will act in the sense of closing the non-return valve 5 when brake fluid enters the blind-end bore 13.

FIG. 2 shows a non-return valve 5 for each pair of pressure modulation valves 10 closed in their basic position. If, however, the hydraulic brake circuit is modified, it may also be possible to assign one non-return valve 5 to each pressure modulation valve 10 closed in its basic position.

Figure 3:
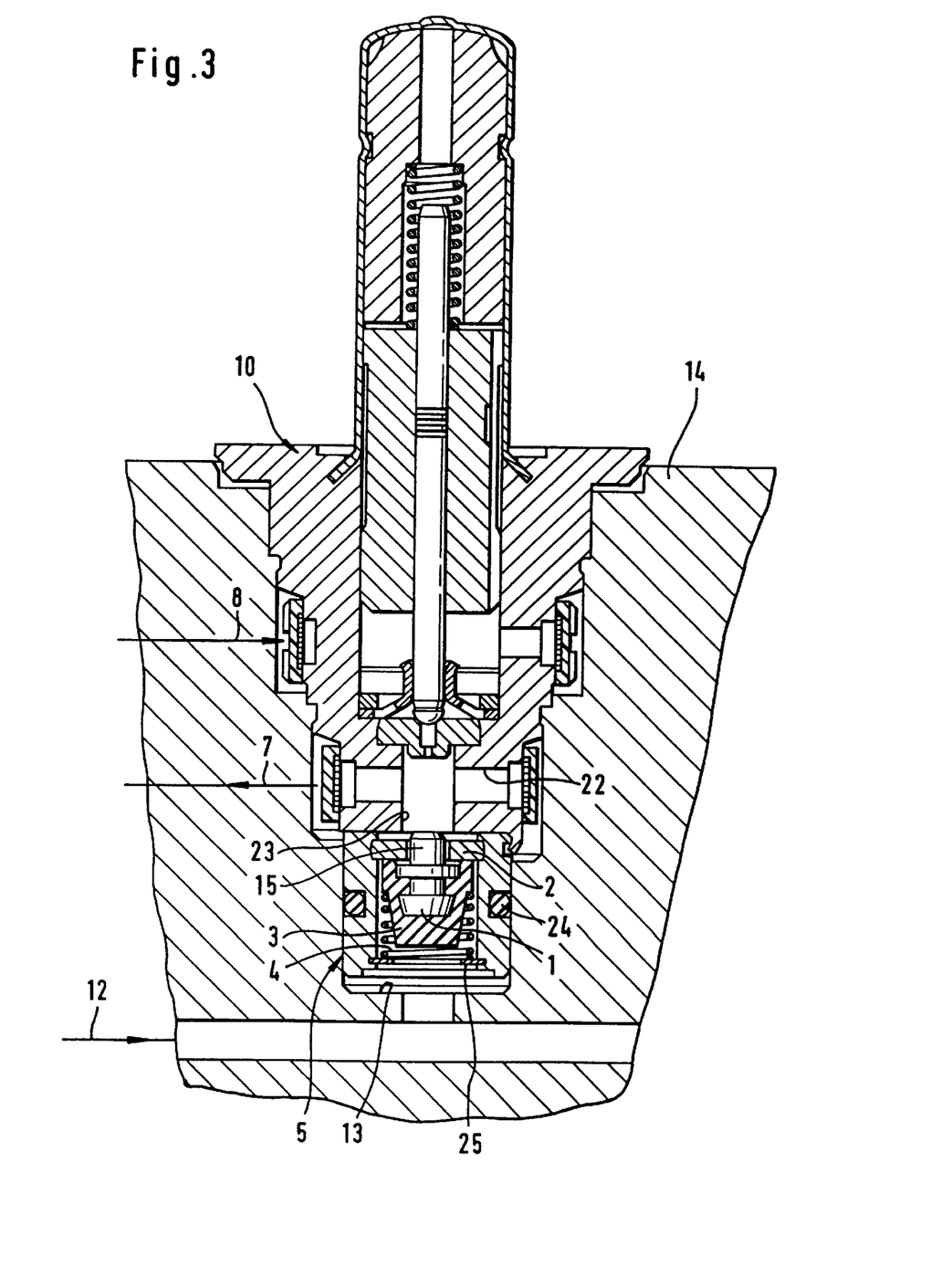
FIG. 3 is, as an alternative of FIG. 2, a separate arrangement of the non-return valve in a cartridge-type construction in an accommodating member.

Based on the embodiments of FIGS. 1 and 2, the FIG. 3 embodiment shows a non-return valve 5 which is slipped as a cartridge unit into the blind-end bore 13 for evacuation and filling of the brake system. The cartridge unit is attached to the bottom end portion of the pressure modulation valve 10 which is closed in its basic position and also manufactured in the cartridge-type construction. The result is a preassembled assembly unit which is adapted to be tested prior to being mounted into the accommodating member 14. Due to the attachment of the cartridge unit to the pressure modulation valve 10, said's bottom end portion includes a transverse channel which is confined by an annular filter and extends to the suction-side pressure fluid port of the pump 7 by way of the blind-end bore 13. According to FIG. 3, both the non-return valve 5 and the pressure modulation valve 10 adopt their closed basic position. Thus, a connecting channel 23 which is positioned coaxially between both valve elements in the valve housing and penetrates the transverse channel 22 is separated both from the pressure fluid port of the wheel brake 8 and from the pressure fluid port of the braking pressure generator 12. An annular seal 24 seals the cartridge unit in the blind-end bore 13. With the given constructive features, the cartridge unit can be made especially favorably from plastic material and, appropriately, also comprises a plastic valve seat member 2. Thus, the cartridge unit is open downwards in the direction of the channel connected to the braking pressure generator 12 for the accommodation of the closure member 1 and the spring 4. The above-mentioned valve components are secured in position in the bowl-shaped cartridge unit by means of a supporting plate 25. The hydraulic pressure applied by the braking pressure generator 12 to the cartridge unit is easily taken up by the bottom surface of the pressure modulation valve 10. The attachment of the cartridge unit for the non-return valve 5 on the pressure modulation valve 10, which is e.g. made by beading or crimping, generally facilitates the assembly when inserting the valve unit, which is comprised of the pressure modulation valve 10 and the non-return valve 5, into the accommodating member 14.

Figure 4:
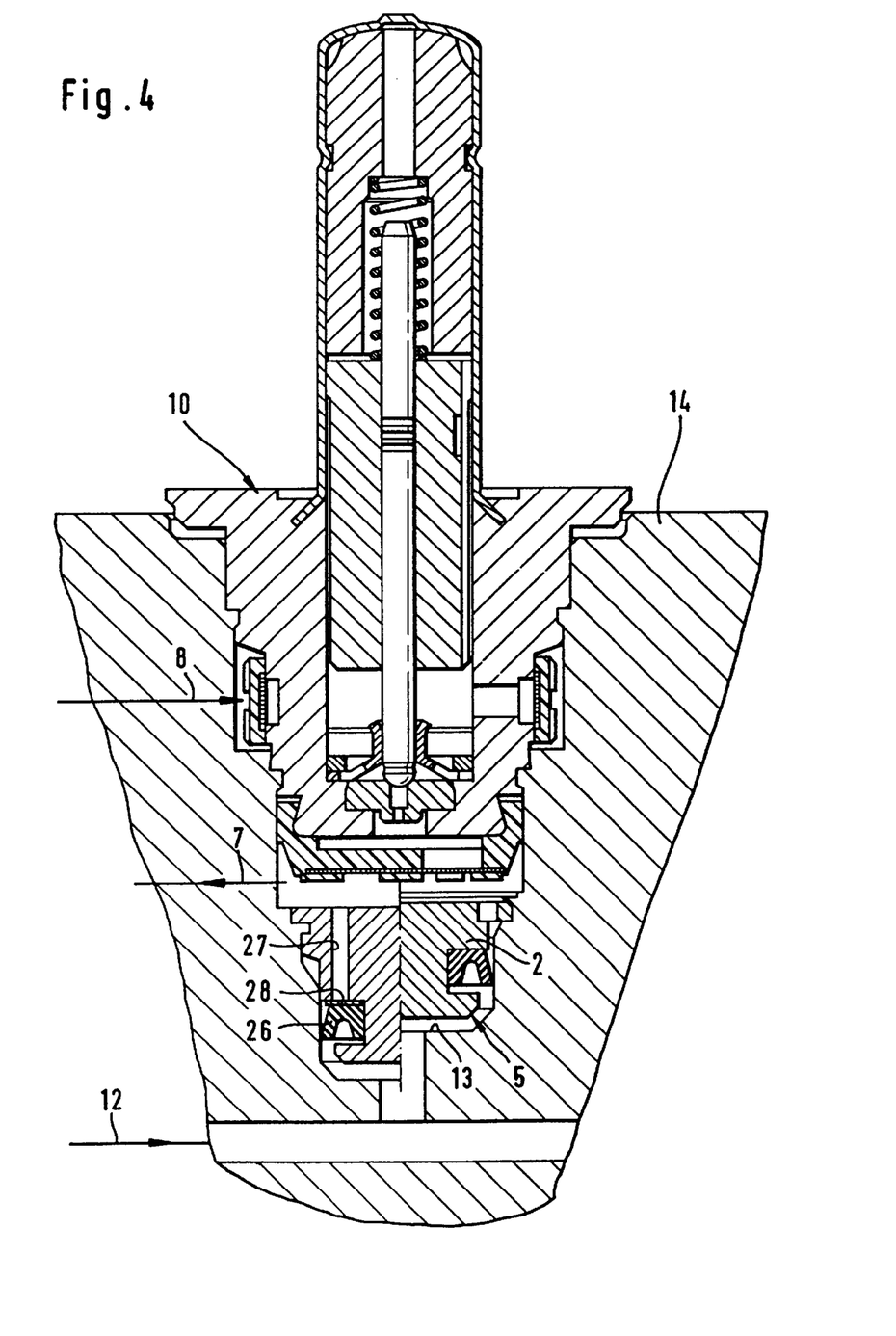
FIG. 4 is a view of the non-return valve as a sleeve-seal non-return valve in a cartridge-type construction, including a self-clinching attachment.

FIG. 4 shows the above-mentioned valve unit in a disintegrated construction, meaning that the cartridge unit of the non-return valve 5, detached from the pressure modulation valve 10, is attached in the blind-end bore 13, for example, by way of a so-called self-clinching engagement. Further, the non-return valve 5 differs from the previous embodiment by using a sleeve seal 26 instead of previously used seat valves acted upon by spring force. The advantage is that the need for a separately positioned spring 4 is eliminated by a corresponding preloading force of the sealing lip. In the present embodiment, the cartridge unit rather resembles a tapered sealing plug having an annular groove for accommodating an annular sleeve. By the action of its internal stress, the sealing lip of the sleeve is urged against the wall of the blind-end bore 13 which quasi adopts the function of a valve seat member. For the evacuation and filling of the secondary circuit which extends downstream of the pressure modulation valve 10 in the direction of the pump 7, the sleeve seal 26 opens in the direction of the channel which is connected downstream of the blind-end bore 13 and communicates with the braking pressure generator 12. The cartridge unit includes a channel 27 which extends up to behind the shoulder of the sleeve seal 26 and is connected to the suction side of the pump 7 by way of an interspace of the two valve units. Preferably, a washer 28 is interposed between the sleeve seal 26 and the groove flank confined by the channel 27.

Figure 5:
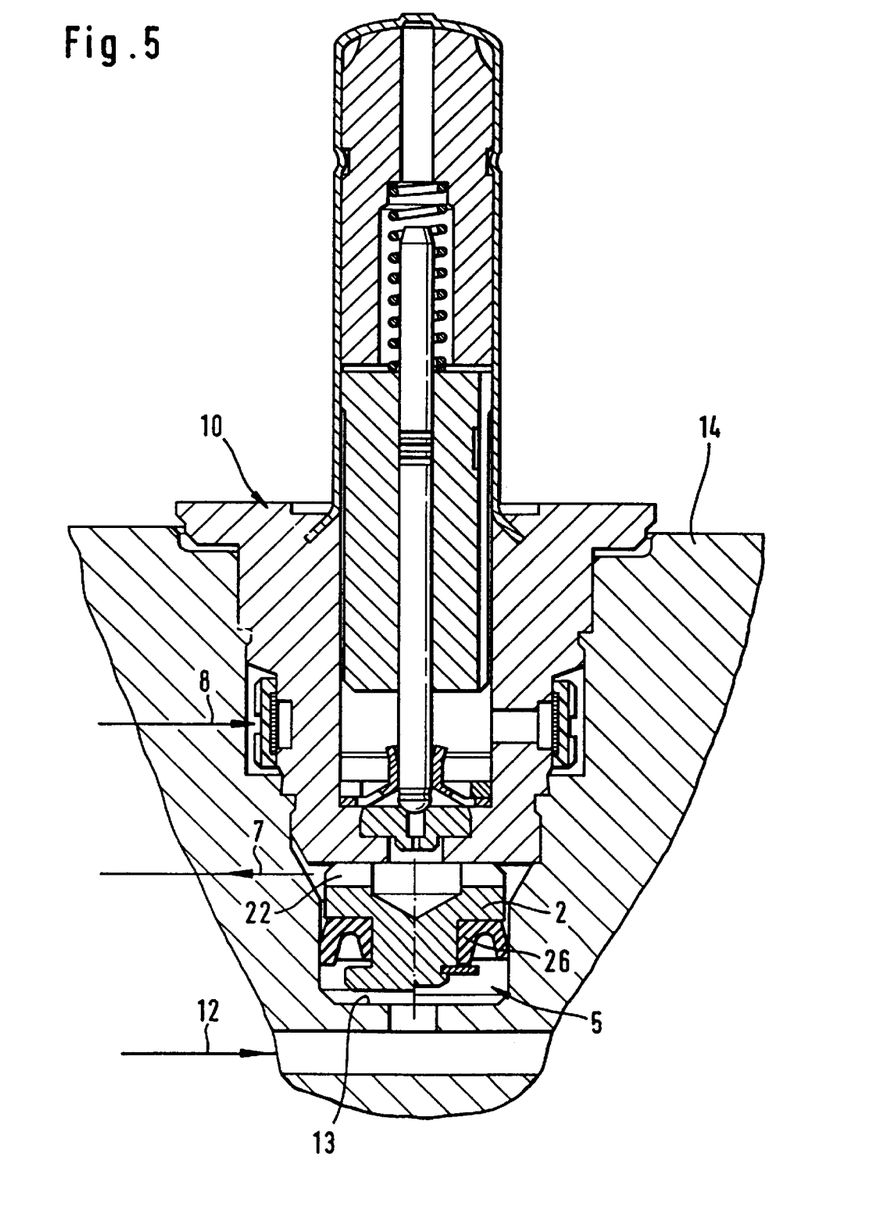
FIG. 5 is a view of the non-return valve as a sleeve seal valve in cartridge-type construction, retained by the pressure modulation valve in positive engagement therewith.

A sleeve seal 26 on a cartridge unit for the operation of the non-return valve 5 is equally disclosed in FIG. 5. Similar to FIG. 3, the cartridge unit is supported on the end surface of the pressure modulation valve 10 which is directed into the blind-end bore 13. Valve 10 is also caulked as a cartridge into the accommodating member 14. The cartridge unit has a radial play in the blind-end bore 13, whereby the radial slot and, thus, the connection between the suction side of the pump 7 and the braking pressure conduit 9, connected to the braking pressure generator 12, is interrupted by the action of the lip preloading force as long as the secondary circuit of the brake is not evacuated.

Figure 6:
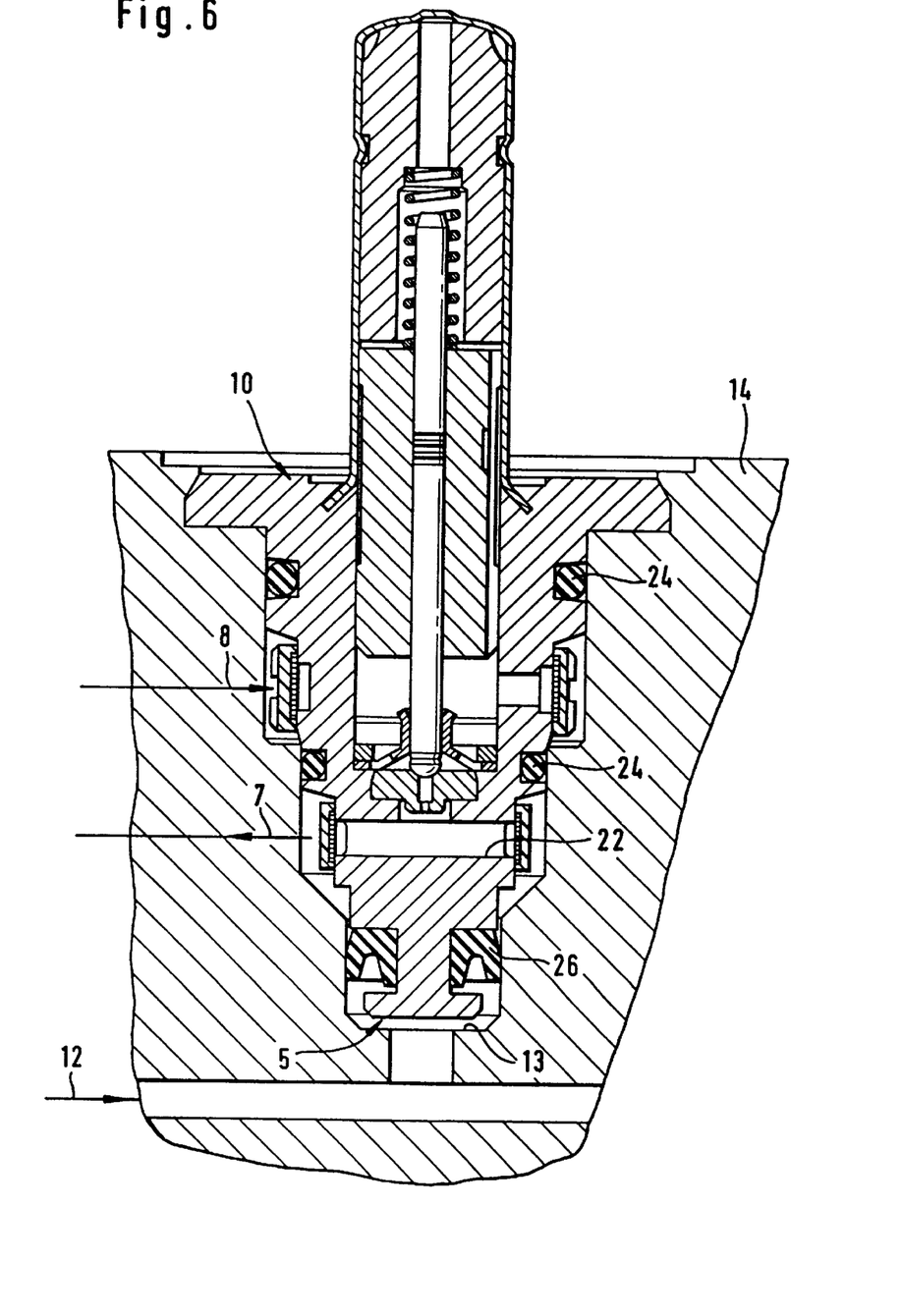
FIG. 6 is a view of the non-return valve, configured as a sleeve-seal non-return valve, which is attached to the pressure modulation valve.

The embodiment of FIG. 6 shows the non-return valve 5 shown in FIGS. 4 and 5 now in a sleeve-type design integral with the cartridge housing of the pressure modulation valve 10. To this end, the cartridge housing includes an extension for accommodating the sleeve seal 26 which extends with play in the bottom portion of the blind-end bore 13. As has already been shown in FIG. 3, the valve unit also has a transverse channel 22 in the cartridge housing between the pressure modulation valve 10 and the non-return valve 5. Channel 22 connects the wheel brake 8 to the suction conduit 6 when the pressure modulation valve 10 is open. The suction conduit 6 is connected through the sleeve seal 26 to the braking pressure generator 12 by way of the radial clearance in the blind-end bore 13 during the evacuation process.

Figure 7:
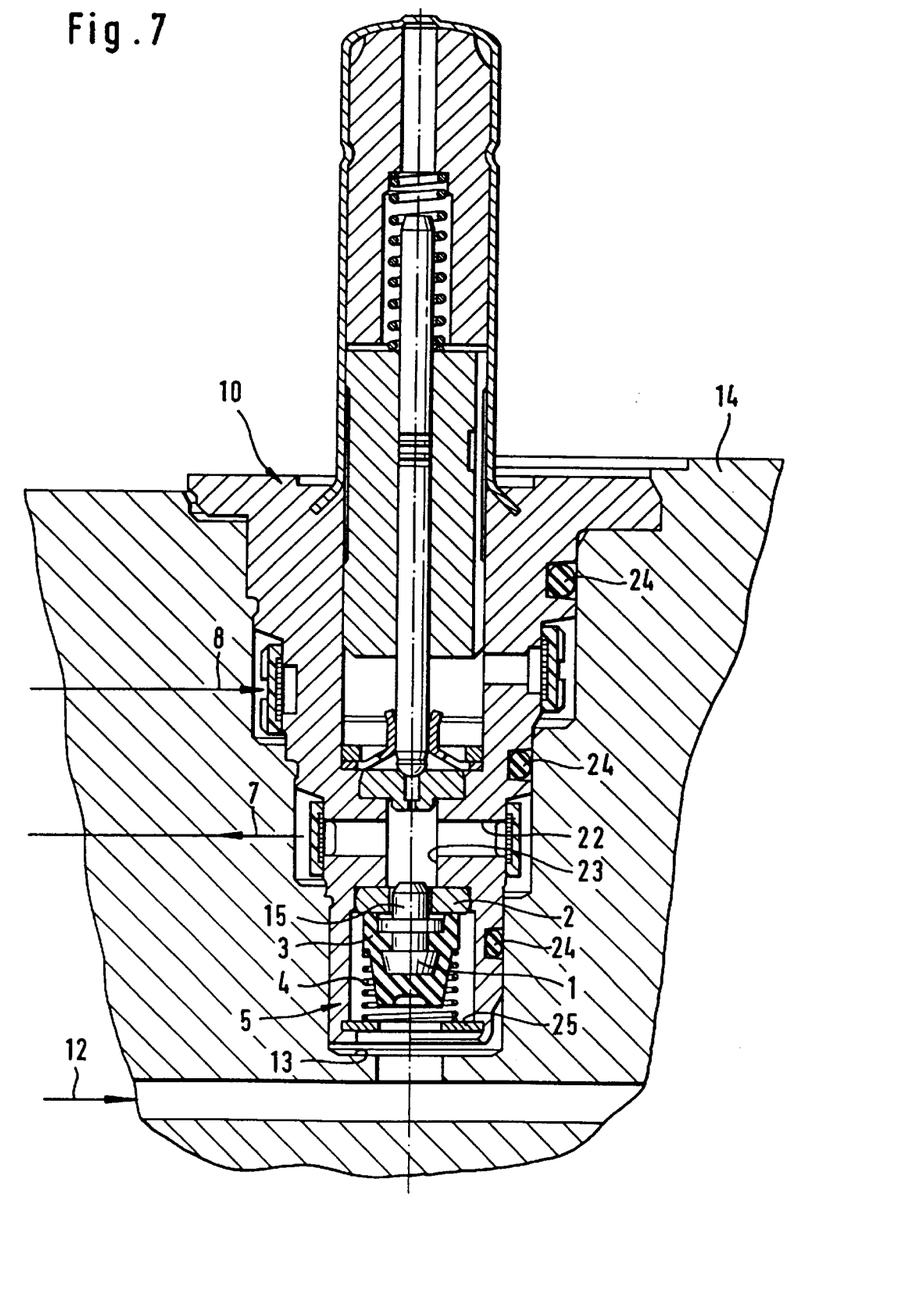
FIG. 7 is a view of the non-return valve, configured as a spring-loaded seat valve, which is integrated in the pressure modulation valve.

The embodiment of FIG. 7 corresponds in many features to the embodiment of FIG. 3 so that only major differences with respect to FIG. 3 will be referred to hereinbelow. The distinguishing feature is that the cartridge housing of the non-return valve 5 is an integral component of the pressure modulation valve 10 which abuts with its sleeve-shaped extension in the blind-end bore 13 by way of a ring seal or by clinching. The illustrated embodiments show all favorable possible solutions of the present invention which are appropriate in view of a non-return valve 5 for the evacuation of the secondary circuit of a brake system which is simple and reliable to manufacture and satisfies test and assembly requirements. Special reference is made to the reduced risk of contamination of the channels which occurs when clearance fits are used for the assembly of the cartridge units (both for the non-return valve assembly unit and for the pressure modulation valve 10).

What is claimed is:

1. Hydraulic automotive vehicle brake system with wheel slip control which includes at least one non-return valve having a valve seat member and a closure member that is lifted from the valve seat member during evacuation of the brake system, a suction conduit connected to a pump and being in communication with a braking pressure conduit when the closure member of the non-return valve has lifted from the valve seat member during evacuation of the brake system, a braking pressure generator and a wheel brake which are interconnected by way of the braking pressure conduit, a pressure modulation valve which, in a closed position, isolates the wheel brake from the suction conduit and from a low-pressure accumulator connected to the suction conduit and from the pump, wherein the closure member is provided by a sleeve seal having a shoulder, and wherein the valve seat member is provided by the annular area of a blind-end bore in an accommodating member that is in contact with the sleeve seal, wherein the non-return valve is attached in the blind-end bore as an independent assembly unit in a cartridge-type construction, in that the cartridge includes a channel which extends until behind the shoulder of the sleeve seal and is connected to the suction side of the pump by way of an interspace between the channel and the pressure modulation valve inserted into the accommodating bore.

* * * * *